A. J. GRIGGS.
Improvement in Whiffletree Hooks.
No. 115,307.  Patented May 30, 1871.
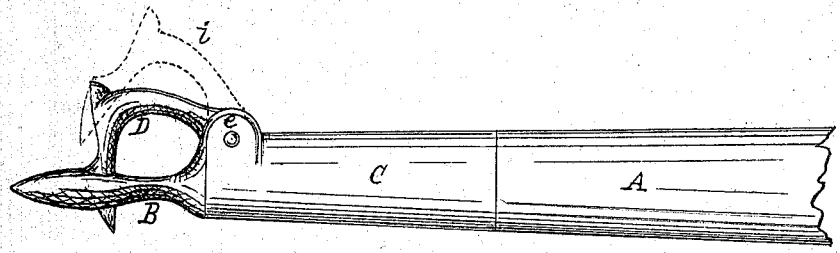
Fig. 1
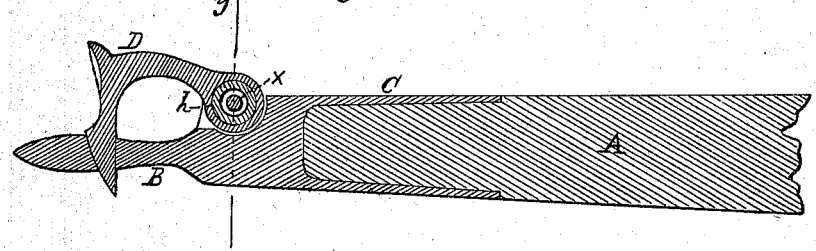
Fig. 2
Fig. 3
Witnesses
A. C. Johnston
L. C. Thomas
Inventor
Andrew J. Griggs
By A. J. Johnston his attorney

115,307

UNITED STATES PATENT OFFICE.

ANDREW J. GRIGGS, OF PITTSBURG, PENNSYLVANIA.

IMPROVEMENT IN WHIFFLETREE-HOOKS.

Specification forming part of Letters Patent No. 115,307, dated May 30, 1871.

*To all whom it may concern:*

Be it known that I, ANDREW J. GRIGGS, of Pittsburg, in the county of Allegheny and State of Pennsylvania, have invented a new and useful Improvement in Trace-Fastener; and I do hereby declare that the following is a full, clear, and exact description thereof, reference being had to the accompanying drawing and to the letters of reference marked thereon.

The nature of my invention consists in providing the whiffletree of a vehicle with a trace-fastener constructed in manner hereinafter described.

In the accompanying drawing which forms part of my specification, Figure 1 represents a side view of my improvement in trace-fastener. Fig. 2 is a longitudinal section of the same. Fig. 3 is a transverse section of the same when cut through at line $y$ of Fig. 2.

To enable others to make and use my invention I will proceed to describe more fully its construction and operation.

A represents a section of a whiffletree, on the end of which is secured the trace-hook B by means of its sockets C, which is provided with lugs $e$, between which is pivoted a hook, D, the point of which is fitted to and enters an opening in the trace-hook B, as shown in Figs. 1 and 2. The back end of the hook D is provided with a recess in which is placed a spiral spring, one end of which is secured in the hook D, and other end secured in the disk $f$. Through the lugs $e$, spiral spring, hook, and disk $f$ passes a pintle, X, which holds the several parts in juxtaposition. By the hereinbefore-described arrangement of the pintle X, spiral spring $h$, and disk $f$, combined with the hook D, a spring action is imparted to the hook D, whereby it is held in position with relation to the trace-hook B, as shown in Figs. 1 and 2.

The operation of securing the trace of the harness on the hook B is as follows: The hook D is raised up, as indicated by the dotted lines $i$ in Fig. 1. The harness-trace is then put on the hook B in the usual manner. The hook D is then allowed to drop back, as shown in Figs. 1 and 2, and thereby holds the harness-trace securely on the hook B, the advantage of which is very apparent.

What I claim is—

The trace-hook B, provided with the spring-hook D, constructed as herein described.

A. J. GRIGGS.

Witnesses:
  A. C. JOHNSTON,
  JAMES J. JOHNSTON.